(12) United States Patent
Stewart et al.

(10) Patent No.: US 7,392,702 B2
(45) Date of Patent: Jul. 1, 2008

(54) METHOD FOR MODIFYING THE LOCATION OF NODAL POINTS OF A VIBRATING BEAM

(75) Inventors: Robert E. Stewart, Woodland Hills, CA (US); Michae W. Denice, Jr., Westlake Village, CA (US)

(73) Assignee: Litton Systems Inc., Woodland Hills, CA (US)

(*) Notice: Subject to any disclaimer, the term of this patent is extended or adjusted under 35 U.S.C. 154(b) by 0 days.

(21) Appl. No.: 11/499,956

(22) Filed: Aug. 7, 2006

(65) Prior Publication Data
US 2007/0034039 A1    Feb. 15, 2007

(51) Int. Cl.
*G01P 9/04* (2006.01)
(52) U.S. Cl. .................. 73/504.12; 73/504.14
(58) Field of Classification Search .............. 73/504.04, 73/504.12, 504.15, 514.16, 514.29, 1.37, 73/1.38, 504.14, 504.02
See application file for complete search history.

(56) References Cited

U.S. PATENT DOCUMENTS

| 4,653,326 | A | * | 3/1987 | Danel et al. ............ 73/514.21 |
| 5,113,698 | A | * | 5/1992 | Grlj et al. ............... 73/862.59 |
| 5,739,410 | A | * | 4/1998 | Fell ........................... 73/1.77 |
| 6,450,030 | B1 | * | 9/2002 | Fujimoto ................ 73/504.04 |
| 6,707,351 | B2 | * | 3/2004 | Gorrell ...................... 333/188 |

* cited by examiner

*Primary Examiner*—Helen C. Kwok
(74) *Attorney, Agent, or Firm*—Patti, Hewitt & Arezina LLC

(57) ABSTRACT

The apparatus in one embodiment may have: a beam having at least first and second mounting points that are operatively coupled to the beam by first and second flexures, respectivly; the beam having first and second nodal points; the beam having a center area; and an altered mass content in a vicinity of the center area, the altered mass content being such that the first and second nodal points are substantially aligned with the first and second flexures. The beam is therefore supported at the nodal points for the fundamental mode of vibration.

21 Claims, 4 Drawing Sheets

METHOD FOR MODIFYING THE LOCATION OF NODAL POINTS OF A VIBRATING BEAM

CROSS-REFERENCE TO RELATED APPLICATIONS

This application contains subject matter that is related to the subject matter of the following application, which is assigned to the same assignee as this application. The below-listed application is hereby incorporated herein by reference in its entirety.

"Vibratory Gyro Bias Error Cancellation Using Mode Reversal", Ser. No. 11/499,958, filed Aug. 7, 2006.

"Bias and Quadrature Reduction in Class II Coriolis Vibratory Gyros", Ser. No. 11/499,957, filed Aug. 7, 2006.

"Oscillation of Vibrating Beam in a First Direction for a First Time Period and a Second Direction for a Second Time Period to Sense Angular Rate of the Vibrating Beam," by Robert E. Stewart, application Ser. No. 11/057,324, filed Feb. 11, 2005.

TECHNICAL FIELD

The invention relates generally to electromechanical systems and more particularly to vibrating beams.

BACKGROUND

An electromechanical system in one example measures a parameter. The electromechanical system may comprise a microelectromechanical system ("MEMS") accelerometer or gyroscope that measures the parameter. For example, the accelerometer measures an acceleration and the gyroscope measures an angular rate (e.g., rotation). The gyroscope in one example comprises a vibrating beam with high Q degenerate fundamental modes of vibration. For example, high Q vibrating beams require little energy to sustain vibration. The vibrating beam in one example is employable for high performance closed loop angular rate sensing. The vibrating beam in another example is employable for lower performance open loop angular rate sensing. The mathematical model of the symmetrical vibrating beam is in many aspects similar to a vibrating ring or hemispherical resonator gyroscope ("HRG"). The analytical similarity to the hemispherical resonator gyroscope indicates that the vibrating beam gyroscope has the potential of achieving similar performance.

Drive components coupled with the vibrating beam cause a first oscillation of the vibrating beam. An angular rate of the vibrating beam and the first oscillation induce a Coriolis force on the vibrating beam. For example, the angular rate is about the longitudinal axis of the vibrating beam. The Coriolis force causes a second oscillation of the vibrating beam. The second oscillation is substantially perpendicular to the first oscillation. Feedback components in one example provide feedback on a magnitude of the first oscillation to the drive components for regulation of the first oscillation. Pickoff sensor components sense the second oscillations and apply control signals to null the pickoff signal. The control signals are a measure of the magnitude and polarity of the angular rate of the vibrating beam.

Coriolis Vibratory Gyros (CVG) based on the free-free vibrating beam are currently used to sense angular rotation rate. The beams are typically supported at the nodal points of the beam to minimize the coupling of the vibration energy to the mounting base. The coupling of vibration energy to the mounting base reduces the Q of the resonant frequency of the beam and introduces sensitivity to variation in the mechanical impedance of the mounting.

There is a need in the art for an improved CVG that minimizes coupling of vibration energy to a mounting base for use in high performance vibrating beam gyros which require high Q and low mounting sensitivity.

SUMMARY

One embodiment of the present method and apparatus encompasses an apparatus. The apparatus may comprise: a beam having at least first and second mounting points that are operatively coupled to first and second flexures; the beam having first and second nodal points; the beam having a center area; and an altered mass content in a vicinity of the center area, the altered mass content being such that the first and second nodal points are substantially aligned with the first and second flexures.

Another embodiment of the present method and apparatus encompasses a method. The method may comprise: providing a beam having at least first and second mounting points that are operatively coupled to first and second flexures, first and second nodal points, and a center area; and altering mass content of the center area such that the first and second nodal points are substantially aligned with the first and second flexures.

DESCRIPTION OF THE DRAWINGS

Features of exemplary implementations of the invention will become apparent from the description, the claims, and the accompanying drawings in which:

DETAILED DESCRIPTION

Vibratory gyros may be a collective name for mechanical devices that in various ways use Coriolis acceleration to sense rotation. These gyros appear in a large number of shapes and are also known as tuning forks, vibrating disks, vibrating wine glass etc.

Figure 1:
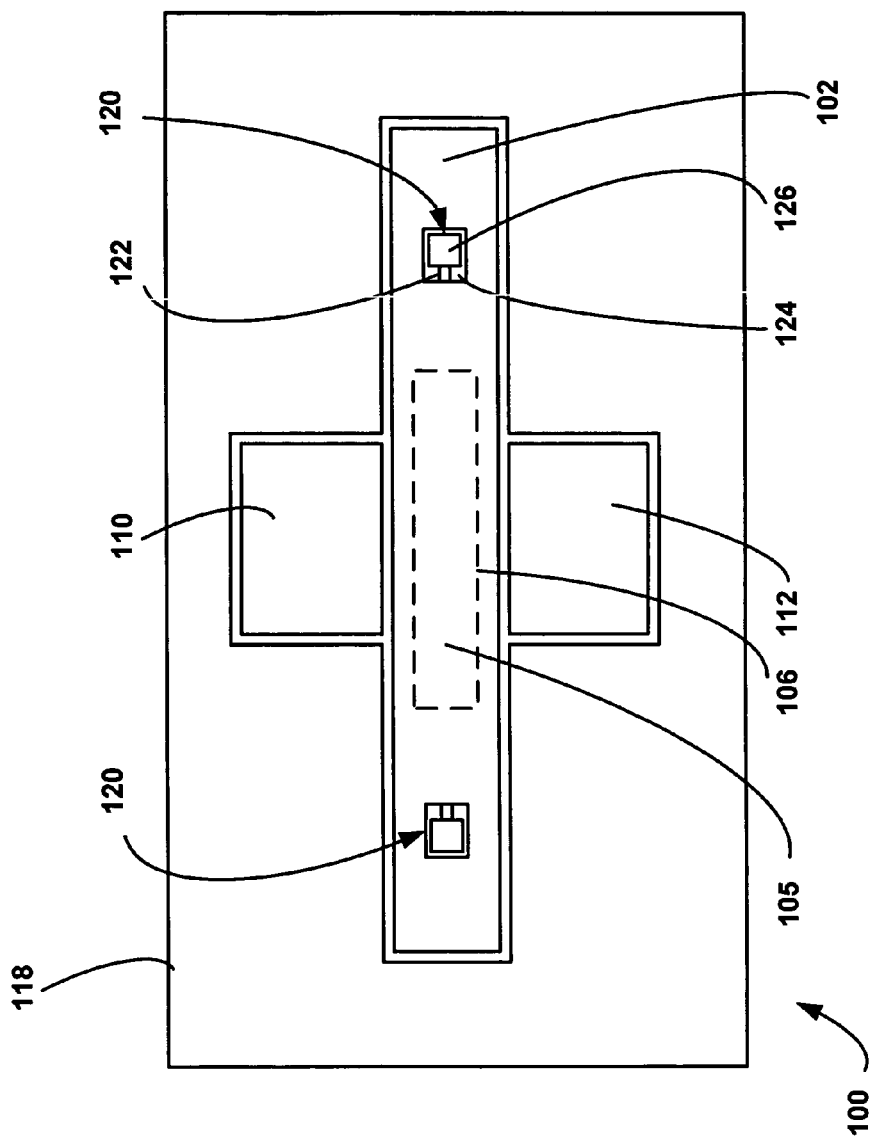
FIG. 1, depicts an apparatus having a microelectromechanical system ("MEMS") gyroscope.

Turning to FIG. 1, an apparatus 100 in one embodiment comprises a microelectromechanical system ("MEMS") gyroscope. The gyroscope is employable for high accuracy navigation angular rate sensing. The apparatus 100 in one example has a vibrating beam 102 and a plurality of drive/sensor components 105, 106, 110, and 112. Depending on an oscillation mode of the vibrating beam 102, a first subgroup of the drive/sensor components 105, 106, 110, and 112 drive a first oscillation of the vibrating beam 102 and a second subgroup of the drive/sensor components 105, 106, 110, and 112 sense a second Coriolis induced oscillation of the vibrating beam 102.

In one example, the drive oscillation of the vibrating beam 102 is along a first direction (e.g., out-of-plane). So, the drive/sensor components 105 and 106 serve as drive components for the vibrating beam 102 and the drive/sensor components 110 and 112 serve as pickoff sensors for the vibrating beam 102. In another example, the drive oscillation of the vibrating beam 102 is along a second direction (e.g., in-plane). So, the drive/sensor components 110 and 112 serve as drive components for the vibrating beam 102 and the drive/sensor components 105 and 106 serve as pickoff sensors for the vibrating beam 102.

The vibrating beam 102 comprises one or more nodal axes for vertical oscillation (e.g., vertical vibration). For example, vertical oscillation of the vibrating beam 102 may occur about the nodal axes. The vibrating beam 102 may also have one or more nodal axes for horizontal oscillation (e.g., horizontal vibration). For example, horizontal oscillation of the vibrating beam 102 may occur about the nodal axes. The nodal axis for vertical oscillation and the nodal axis for horizontal oscillation in one example intersect at a nodal point. The nodal point remains substantially still for oscillation in any one or more of a plurality of substantially perpendicular directions. For example, the nodal point remains substantially still during both vertical oscillation and horizontal oscillation. The vibrating beam 102 may have one or more connection components 120 that serve to connect a frame 118 with the vibrating beam 102 at the nodal point of the vibrating beam 102. Also, the one or more connection components 120 may have one or more mounting points 126 used to connect the frame 118 with the vibrating beam 102.

The vibrating beam 102 in one example is supported by a flexure component 122 connected to the frame 118 through top and bottom covers (not shown). The flexure component 122 allows movement of the vibrating beam 102 about the nodal point upon occurrence of an angular rate. For example, the angular rate is about the longitudinal axis of the vibrating beam. Pickoff sensors and processing components measure and translate the movement of the vibrating beam 102 into a signal representing the direction and magnitude of the angular rate.

The flexure component 122 allows horizontal and vertical oscillation of the vibrating beam 102 about the nodal point. The flexure component 122 may have a reduced section of the vibrating beam 102 that lies along a center line of a longitudinal axis of the vibrating beam 102. The nodal point in one example is internal to the vibrating beam 102. For example, the vibrating beam 102 may have one or more apertures 124 that expose an area around the nodal point. The aperture 124 in one example passes through the vibrating beam 102. The aperture 124 surrounds the nodal point and the flexure component 122 to provide space for movement of the vibrating beam 102. The aperture 124 is near the nodal point. The aperture 124 allows the frame 118 to support the vibrating beam substantially near the nodal point. The aperture 124 may have an open space etched from a surface of the vibrating beam 102 to expose the nodal point and form the flexure component 122.

To initialize an angular rate sensing gyroscope, the drive components of the drive/sensor components 105, 106, 110, and 112 cause a first oscillation of the vibrating beam 102. An angular rate of the vibrating beams 102 about its longitudinal axes and the first oscillation induce a Coriolis force on the vibrating beam 102. The Coriolis force causes a second oscillation of the vibrating beam 102. The second oscillation is substantially perpendicular to the first oscillation. Feedback components in one example provide feedback on a magnitude of the first oscillation to the drive component 106 for regulation of the first oscillation. The sensor components of the drive/sensor components 105, 106, 110, and 112 pickoff the second oscillations and apply control signals to null the pickoff signal. The control signals are measure of the magnitude and polarity of the angular rate of the vibrating beam 102.

The drive components of the drive/sensor components 105, 106, 110, and 112 in one example may have electrostatic drive components, magnetic drive and/or piezoelectric drive components. The sensor components of the drive/sensor components 105, 106, 110, and 112 in one example may have capacitive pickoff sensors, magnetic pickoff sensors, piezoresistive sensors, and/or piezoelectric pickoff sensors.

A beam may be supported at the nodal points for the fundamental mode of vibration. Since achieving high Q is important to achieving high performance of the gyro, in one example it is desirable to minimize the vibration energy lost through coupling to the mounting structure.

The location of the nodal points of a beam with a rectangular crossection may be given by:

$$X_{node} = 0.267 \, L$$

where:

$X_{node}$ = Distance from the center of the beam to each nodal point

L = Total length of the beam

The location of the mounting points is determined by design of the beam. Manufacturing tolerances will cause the location of the mounting points to not be at the nodal points. In order to minimize the coupling of the vibration energy of the beam to the mounting structure it is desirable to compensate for the manufacturing tolerances and adjust the location of the nodal points to be at the mounting points. Embodiments according to the present method and apparatus provide a simple and controllable method of adjusting the location of the nodal points.

Figure 2:
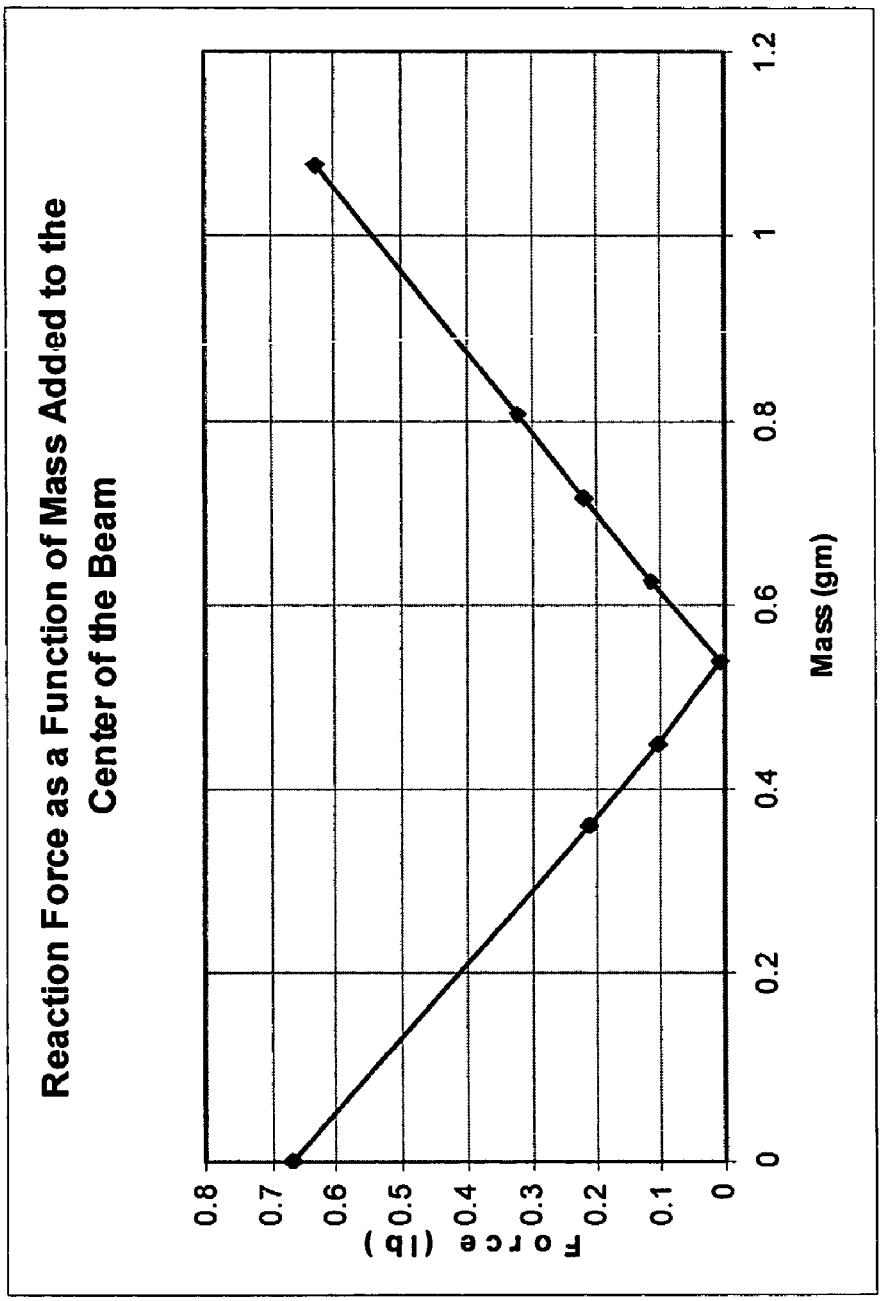
FIG. 2 is a graph of reaction force as a function of mass added to the center of the beam.

FIG. 2 shows results of a computer simulation. These results show that the addition or removal of mass from the center of the beam changes the location of nodal points and that the translational force at the mounting point may be reduced to zero.

FIG. 2 is a plot of the simulation results showing that adding 0.55 gm to the center of the beam reduces the translational force linearly from 0.67 lb to 0. Adding additional mass causes the translational force to increase as the nodal points are moved away from the mounting points. In this simulation it is assumed that the mounting points are located symmetrically about the center of the beam.

Figure 3:
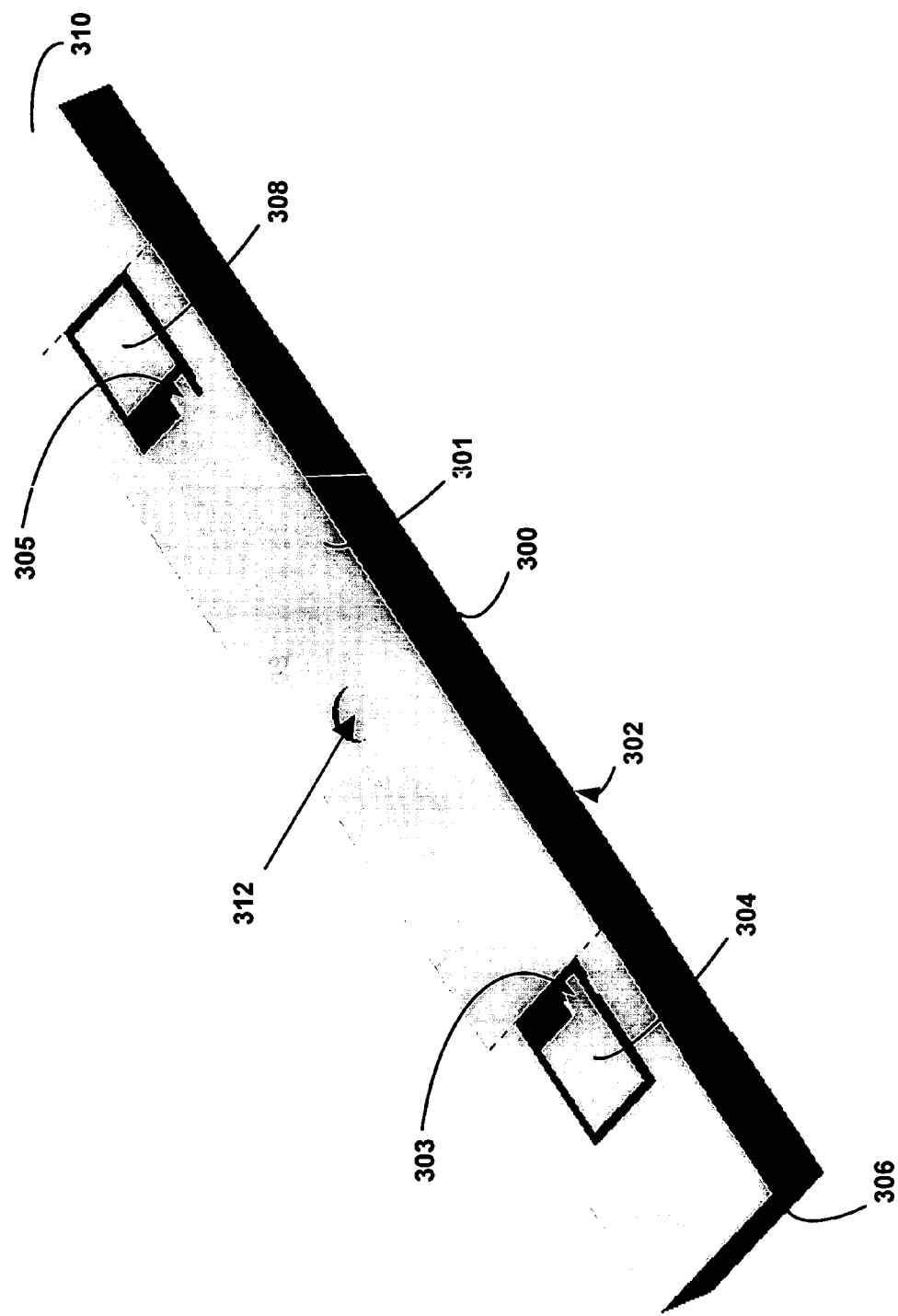
FIG. 3 depicts an embodiment of a method according to the present method.

FIG. 3 is a representation of an exemplary implementation of a beam 300 with mass removed from one or more sides 301, 302 of the beam 300 to adjust the location of the nodal point. The beam 300 may have mounting points 304, 308 located in an area of ends 306, 310 of the beam 300. The mounting points 304, 308 are coupled to the beam 300 by flexures 303, 305. In order to align the nodal points with the flexures 303, 305, mass at the center area 312 of the beam 300 may be changed.

More specifically, mass may be subtracted from the center area 312 from one or both of the sides 301, 302 of the beam 300. Also, mass may be added to the center area 312 from one or both of the sides 301, 302 of the beam 300. Furthermore, mass may be added to one side 301, 302 of the beam 300, while mass may be removed from the other side 301, 302 of the beam 300.

Figure 4:
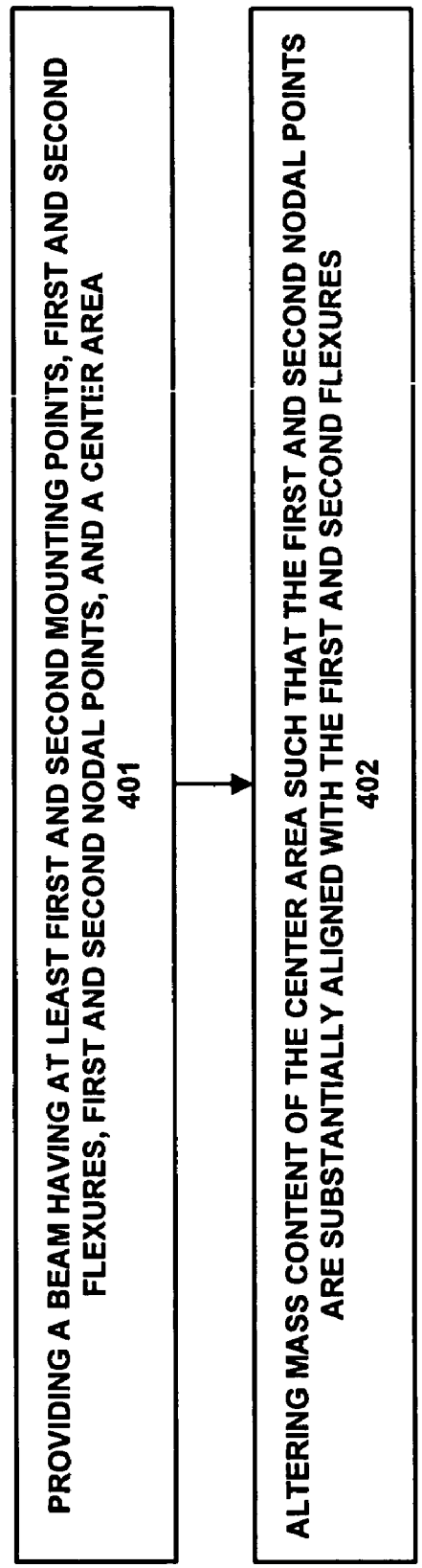
FIG. 4 depicts another embodiment of a method according to the present method.

FIG. 4 depicts another embodiment of a method according to the present method. In FIG. 4, two steps are shown in a method of operating the present invention. In step 401, a beam is provided having at least first and second mounting points, first and second flexures, first and second nodal points, and a center area. In step 402, mass content of the center area is altered such that the first and second nodal points are substantially aligned with the first and second flexures.

The present apparatus in one example may comprise a plurality of components such as one or more of electronic components, hardware components, and computer software components. A number of such components may be combined or divided in the apparatus.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
    a beam having at least first and second mounting points operatively coupled to the beam by respective first and second flexures;
    the beam having first and second nodal points;
    the beam having a center area; and
    an altered mass content in a vicinity of the center area, the altered mass content being such that the first and second nodal points are substantially aligned with the first and second flexures.

2. The apparatus according to claim 1, wherein the beam has a substantially rectangular cross-section with first and second sides, and first and second ends, and wherein the beam has a first mounting point in a vicinity of the first end, and a second mounting point in a vicinity of the second end.

3. The apparatus according to claim 2, wherein mass is subtracted from the center area of one of the sides of the beam.

4. The apparatus according to claim 2, wherein mass is subtracted from the center area of both of the sides of the beam.

5. The apparatus according to claim 2, wherein mass is added to the center area of one of the sides of the beam.

6. The apparatus according to claim 2, wherein mass is added to the center area of both of the sides of the beam.

7. The apparatus according to claim 2, wherein mass is subtracted from the center area of one of the sides of the beam, and wherein mass is added to the center area of the other of the sides of the beam.

8. An apparatus, comprising:
    a beam having first and second sides, and first and second ends;
    the beam having a first mounting point in a vicinity of the first end, and a second mounting point in a vicinity of the second end, the first and second mounting points operatively coupled to the first and second sides by respective first and second flexures;
    the beam having first and second nodal points;
    the beam having a center area; and
    an altered mass content in a vicinity of the center area, the altered mass content being such that the first and second nodal points are substantially aligned with the first and second flexures.

9. The apparatus according to claim 8, wherein mass is subtracted from the center area of one of the sides of the beam.

10. The apparatus according to claim 8, wherein mass is subtracted from the center area of both of the sides of the beam.

11. The apparatus according to claim 8, wherein mass is added to the center area of one of the sides of the beam.

12. The apparatus according to claim 8, wherein mass is added to the center area of both of the sides of the beam.

13. The apparatus according to claim 8, wherein mass is subtracted from the center area of one of the sides of the beam, and wherein mass is added to the center area of the other of the sides of the beam.

14. A method, comprising the steps of:
    providing a beam having at least first and second mounting points that are coupled to the beam by first and second flexures, respectively, first and second nodal points, and a center area; and
    altering mass content of the center area such that the first and second nodal points are substantially aligned with the first and second flexures.

15. The method according to claim 14, wherein in the step of providing a beam, the beam has a substantially rectangular cross-section with first and second sides, and first and second ends, and wherein the beam has a first mounting point in a vicinity of the first end, and a second mounting point in a vicinity of the second end.

16. The method according to claim 15, further comprising the step of subtracting mass from the center area of one of the sides of the beam.

17. The method according to claim 15, further comprising the step of subtracting mass from the center area of both of the sides of the beam.

18. The method according to claim 15, further comprising the step of adding mass to the center area of one of the sides of the beam.

19. The method according to claim 15, further comprising the step of adding mass to the center area of both of the sides of the beam.

20. The method according to claim 15, further comprising the step of subtracting mass from the center area of one of the sides of the beam, and adding mass to the center area of the other of the sides of the beam.

21. The apparatus according to claim 1, wherein the addition of mass to the center area reduces translational force linearly.

* * * * *